(12) United States Patent
Pimentel

(10) Patent No.: US 8,898,276 B1
(45) Date of Patent: Nov. 25, 2014

(54) SYSTEMS AND METHODS FOR MONITORING NETWORK PORTS TO REDIRECT COMPUTING DEVICES TO A PROTECTED NETWORK

(75) Inventor: Plinio Pimentel, Highland, UT (US)

(73) Assignee: Crimson Corporation, Dover, DE (US)

( * ) Notice: Subject to any disclaimer, the term of this patent is extended or adjusted under 35 U.S.C. 154(b) by 1252 days.

(21) Appl. No.: 11/622,398

(22) Filed: Jan. 11, 2007

(51) Int. Cl.
*G06F 15/173* (2006.01)

(52) U.S. Cl.
USPC .......................................... 709/224; 726/24

(58) Field of Classification Search
USPC ................................ 709/223–226; 726/3–15
See application file for complete search history.

(56) References Cited

U.S. PATENT DOCUMENTS

| | | | |
|---|---|---|---|
| 5,414,833 A | 5/1995 | Hershey et al. | |
| 6,260,073 B1 | 7/2001 | Walker et al. | |
| 6,763,378 B1 | 7/2004 | Hamilton, II et al. | |
| 6,988,208 B2 | 1/2006 | Hrabik et al. | |
| 7,089,589 B2 * | 8/2006 | Chefalas et al. | 726/22 |
| 7,137,145 B2 | 11/2006 | Gleichauf | |
| 7,333,800 B1 * | 2/2008 | Gopinath | 455/411 |
| 8,006,305 B2 * | 8/2011 | Aziz | 726/24 |
| 8,171,553 B2 * | 5/2012 | Aziz et al. | 726/24 |
| 8,291,499 B2 * | 10/2012 | Aziz et al. | 726/24 |
| 8,375,444 B2 * | 2/2013 | Aziz et al. | 726/23 |
| 8,458,797 B1 * | 6/2013 | Yu et al. | 726/24 |
| 8,516,593 B2 * | 8/2013 | Aziz | 726/24 |
| 8,528,086 B1 * | 9/2013 | Aziz | 726/23 |
| 8,549,638 B2 * | 10/2013 | Aziz | 726/23 |
| 8,584,239 B2 * | 11/2013 | Aziz et al. | 726/24 |
| 8,635,696 B1 * | 1/2014 | Aziz | 726/23 |
| 8,689,333 B2 * | 4/2014 | Aziz | 726/24 |
| 2002/0162015 A1 * | 10/2002 | Tang | 713/200 |
| 2002/0194489 A1 * | 12/2002 | Almogy et al. | 713/200 |
| 2002/0194490 A1 * | 12/2002 | Halperin et al. | 713/200 |
| 2004/0111632 A1 * | 6/2004 | Halperin | 713/200 |
| 2006/0053491 A1 * | 3/2006 | Khuti et al. | 726/23 |
| 2006/0112174 A1 * | 5/2006 | L'Heureux et al. | 709/223 |
| 2006/0256730 A1 * | 11/2006 | Compton | 370/250 |
| 2006/0288414 A1 * | 12/2006 | Kuroda | 726/24 |
| 2007/0030850 A1 * | 2/2007 | Grosse | 370/392 |
| 2007/0250930 A1 * | 10/2007 | Aziz et al. | 726/24 |
| 2008/0005782 A1 * | 1/2008 | Aziz | 726/3 |
| 2011/0093951 A1 * | 4/2011 | Aziz | 726/24 |
| 2011/0099633 A1 * | 4/2011 | Aziz | 726/24 |
| 2012/0005756 A1 * | 1/2012 | Hoefelmeyer et al. | 726/24 |
| 2012/0174186 A1 * | 7/2012 | Aziz et al. | 726/1 |
| 2012/0331553 A1 * | 12/2012 | Aziz et al. | 726/23 |
| 2013/0036472 A1 * | 2/2013 | Aziz | 726/24 |
| 2013/0047257 A1 * | 2/2013 | Aziz | 726/24 |

* cited by examiner

*Primary Examiner* — Ninos Donabed
(74) *Attorney, Agent, or Firm* — Austin Rapp & Hardman

(57) ABSTRACT

A method for redirecting a computing device from a first network to a second network is described. A plurality of network ports is monitored. A communication from a computing device is detected at one of the network ports. Information is sent to a first server and a second server regarding the identity of the computing device. A command is sent to the first server to send a request to the computing device to renew the connection with the second server. The computing device is redirected to a second network from a first network.

19 Claims, 9 Drawing Sheets

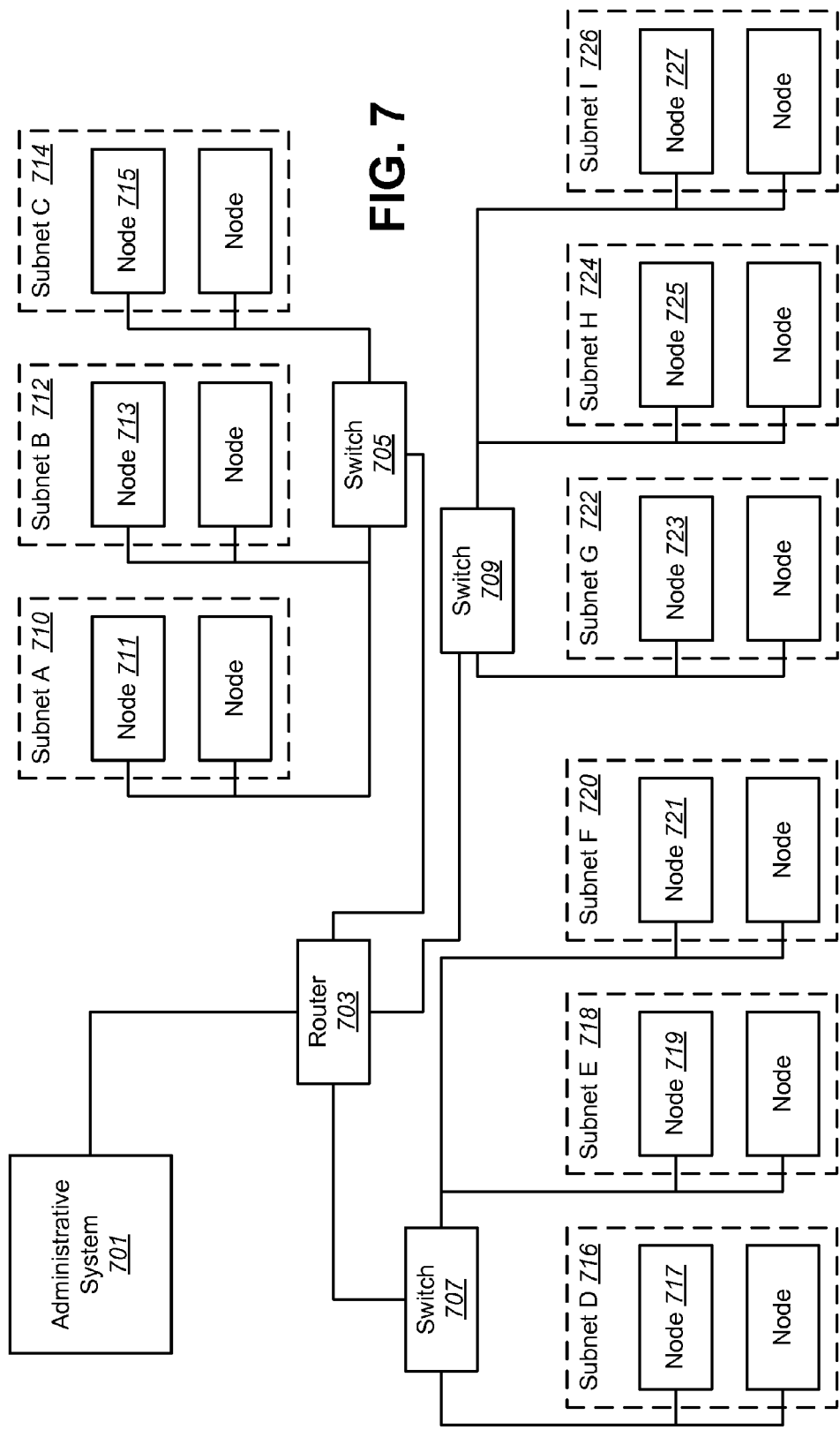

SYSTEMS AND METHODS FOR MONITORING NETWORK PORTS TO REDIRECT COMPUTING DEVICES TO A PROTECTED NETWORK

TECHNICAL FIELD

The present invention relates generally to computers and computer-related technology. More specifically, the present invention relates to monitoring network ports to redirect computing devices to a protected network.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Recently, computers have become more vulnerable to harmful elements that may harm or destroy various capabilities and components of the computer. These harmful elements may be referred to as computer viruses and worm software. Maintaining and supporting computer systems also typically includes addressing the threat of computer viruses and worm software and dealing with problems caused by the viruses and/or worms.

Installing new computer hardware and/or software, addressing issues relating to viruses and worms, or fixing problems with existing systems, may cause down-time during which the business or individual operates at a diminished level. Most individuals and businesses try to minimize computer problems so as to avoid down-time.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 7 is a block diagram illustrating a computer network on which the present systems and methods may be implemented.

DETAILED DESCRIPTION

Figure 1:
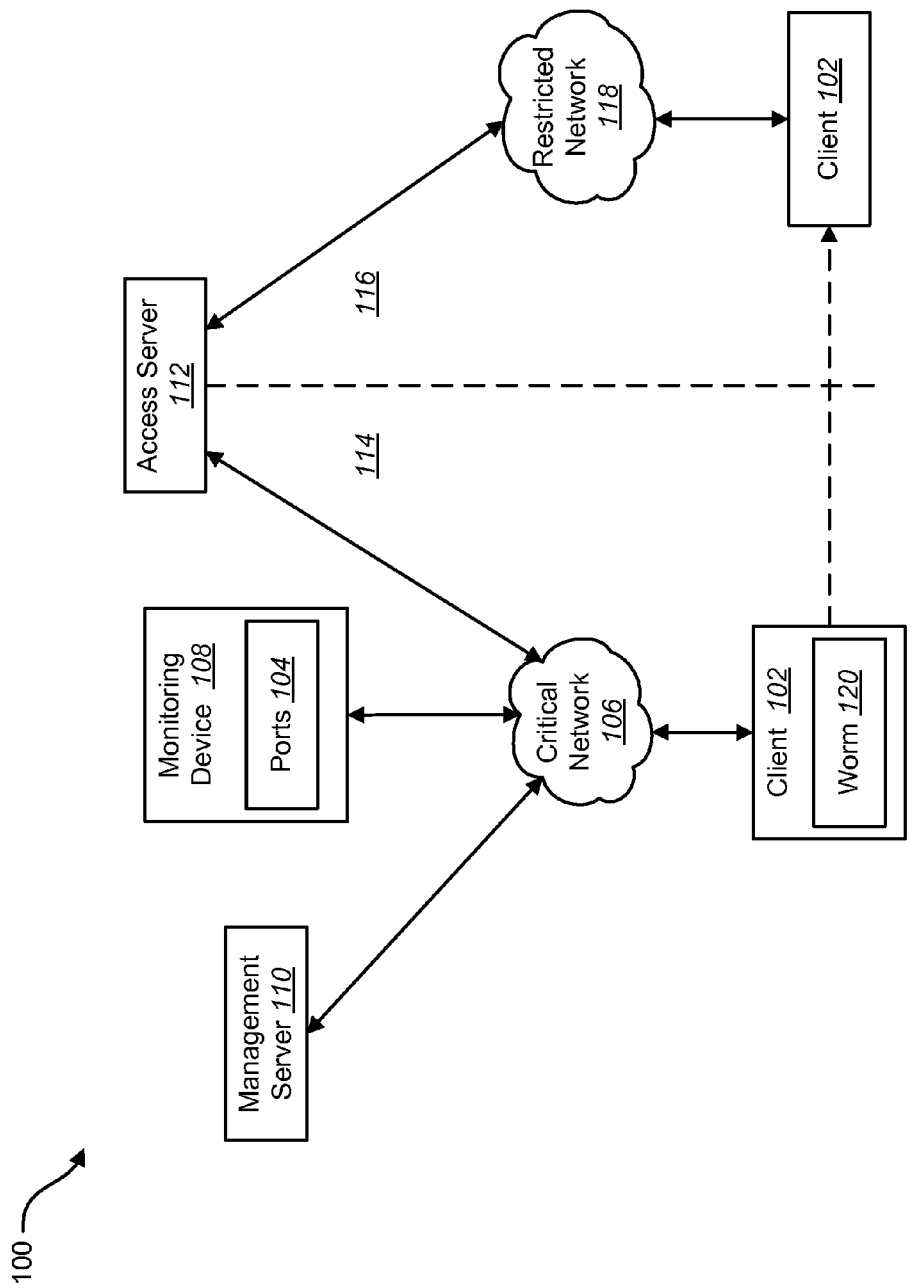
FIG. 1 is a block diagram illustrating one embodiment of a monitoring system.

A method for redirecting a computing device from a first network to a second network is described. A plurality of network ports is monitored. A communication from a computing device is detected at one of the network ports. Information is sent to a first server and a second server regarding the identity of the computing device. A command is sent to the first server to send a request to the computing device to renew the connection with the second server. The computing device is redirected to a second network from a first network.

In one embodiment, a determination is made if the communication detected at one of the plurality of network ports includes a harmful element. The harmful element may comprise a worm. The harmful element may comprise a computer virus. In one embodiment, a subset of network ports are monitored. The subset of ports may include ports 135, 137, 138, 139, 161, 162, 389 and 445.

A monitoring application may monitor the plurality of network ports. The monitoring application may be implemented on a monitoring device. In one embodiment, the second server redirects the computing device from the first network to the second network. A monitoring application may monitor a plurality of ports, wherein the monitoring application may detect a communication comprising a harmful element at one of the ports, where the monitoring application may send the identity of the computing device to the first server and the second server, wherein the computing device may renew the connection with the second server, and wherein the second server may redirect the computing device to the second network.

A computer system that is configured to redirect a computing device from a first network to as second network is also described. The computer system includes a processor and memory in electronic communication with the processor. Instructions are stored in the memory. A plurality of network ports is monitored. A communication from a computing device is detected at one of the network ports. Information is sent to a first server and a second server regarding the identity of the computing device. A command is sent to the first server to send a request to the computing device to renew the connection with the second server, wherein the second server redirects the computing device to a second network from a first network.

In one embodiment, a harmful element is detected within the communication detected at one of the network ports. The harmful element may comprise a worm. The harmful element may comprise a computer virus. A subset of the plurality of network ports may be monitored. In one embodiment, the subset of ports comprises ports 135, 137, 138, 139, 161, 162, 389 and 445.

A non-transitory computer-readable medium comprising executable instructions to redirect a computing device from a first network to a second network is also described. A plurality of network ports is monitored. A communication from a computing device is detected at one of the network ports. Information is sent to a first server and a second server regarding the identity of the computing device. A command is sent to the first server to send a request to the computing device to renew the connection with the second server, wherein the second server redirects the computing device to a second network from a first network.

In one embodiment, a harmful element is detected in the communication received at one of the network ports. A subset of the plurality of network ports may be monitored. In one embodiment, the subset of ports comprises ports 135, 137, 138, 139, 161, 162, 389 and 445.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

Recently, computers have become more vulnerable to harmful elements that may harm or destroy various capabilities and components of the computer. These harmful elements may be referred to as computer viruses and worm software. The server may prevent computers with these harmful elements from joining the network. Security management software may be used to provide the server with the ability to verify that the computer does not include harmful elements before allowing the computer to join the network. Security management software may enable the server to scan the computer for the harmful elements before allowing the computer to join the network. This verification may prevent the harmful elements from affecting other computers joined on the network.

Unfortunately, computers may acquire harmful elements subsequent to joining the computer network. These harmful elements may then propagate from one computer to the next on the network. The spread of the harmful elements to other computers may cause varying degrees of harm to the hardware and software components of the computers interconnected on the network. The limited computing capacity of the server is in high demand and it may not be efficient to require the server to constantly scan the computers on the network for these harmful elements.

FIG. 1 is a block diagram illustrating one embodiment of a monitoring system 100 which may include a monitoring device 108 with a plurality of network ports 104. In one embodiment, the monitoring device 108 may be a server, personal computer, laptop computer, etc. The network ports 104 may serve as an interface between the monitoring device 108 and other computing devices. The ports 104 may include hardware or software ports. Hardware ports may serve as an interface between the monitoring device and other computers or devices. Software ports may include a virtual data connection that may be used by programs to exchange data directly, instead of going through a file or other temporary storage location. Examples of software ports may include transmission control protocol (TCP) and user datagram protocol (UDP) ports which may be used to exchange data between computers on the Internet. In one embodiment, the ports 104 may enable the monitoring device to connect to a critical network 106. The ports 104 may also be enabled to listen for data or requests received from other computing devices connected to the critical network 106.

In one embodiment, the critical network 106 is a secure network in which only secure computing devices are allowed access. In one embodiment, the computing devices communicating over the critical network 106 may establish a secure environment 114. Examples of the critical network 106 may include a corporate network in which secure computing devices that have been approved by a corporate server are allowed access. A secure computing device may include a device that does not possess harmful elements that serves to harm or destroy the hardware or software of other computing devices. Examples of harmful elements may include worm software 120 and computer viruses.

The worm software 120 may use computer networks and security flaws to create copies of itself. A copy of the worm may scan the network for any other computing device that may have a specific security flaw. The worm 120 may replicate itself to the new computing device using the security flaw, and then the worm may begin scanning and replicating anew. The worm software 120 may attack computing devices by corrupting and destroying program files, applications, data, etc within the computing device. In one embodiment, the worm 120 does not require an executable file in order to infect the computing device. The worm 120 may utilize the transmission capabilities of the computing device and travel from one computing device to another within a network. For example, if the worm software 120 successfully infects a server connected to a network, the worm 120 may be enabled to attack the various computing devices in communication with the server over the network. Similarly, if the worm software 120 successfully infects a computing device connected to the critical network 106, the worm software 120 may then be enabled to attack other computing devices connected to the critical network 106. Worms 120 (worm software 120) are known in the art.

The monitoring device 108 may serve to prevent a harmful element from attacking other computing devices on the critical network 106. In one embodiment, the monitoring device 108 maintains the ports 104, typically vulnerable to the harmful elements, open and monitored. An open port may include the ability to receive/send data from/to other computing devices. The computing devices may be referred to as clients. A client 102 may communicate with the monitoring device 108 through one or more of the ports 104 over the critical network 106. In one embodiment, the client 102 includes a harmful element, such as the worm software 120. The worm 120 may attempt to attack the monitoring device 108 through one of the open ports 104 on the monitoring device 108. In one embodiment, the worm 120 may attempt to infect the monitoring device 108 because the device 108 may appear to possess the characteristics of a server. The worm 120 may believe the monitoring device 108 is an actual server that is in communication with a plurality of additional computing devices on the critical network 106 that the worm 120 would be able to infect. The worm 120 may desire to utilize the transmission capabilities of the monitoring device 108 to travel from the client 102 to the monitoring device 108 and then to the computing devices connected to the device 108 over the critical network 106. In this regard, the monitoring device 108 may be referred to as a bait server because it serves to bait the worm 120 to attack the device 108 through an open port.

The monitoring device 108 may communicate the identity of the infected client 102 to a management server 110 and an access server 112. The management server 110 and the access server 112 may be part of the secure environment 114 and in communication with the client 102 over the critical network 106. The management server 110 may send messages to clients connected to the critical network 106. The access server 112 may regulate which clients are allowed access to connect to the critical network 106. In one embodiment, the management server 110 may send a request to the client 102 to renew its connection with the access server 112 over the critical network 106. When the client 102 renews the connection over the critical network 106, the access server 112 may redirect the client 106 from communicating over the critical network 106 to a restricted network 118. The restricted network 118 may prevent the infected client 102 from communicating with other computing devices connected to the critical network 106. Preventing the infected client 102 from communicating with other computing devices connected on the critical network 106 may prevent the harmful element installed on the client 102 from attacking the other computing devices on the critical network 106. The client 102 may remain connected to the restricted network 118, in a restricted environment 116, until remediation may be performed and the harmful element is eliminated from the client 102.

Figure 2:
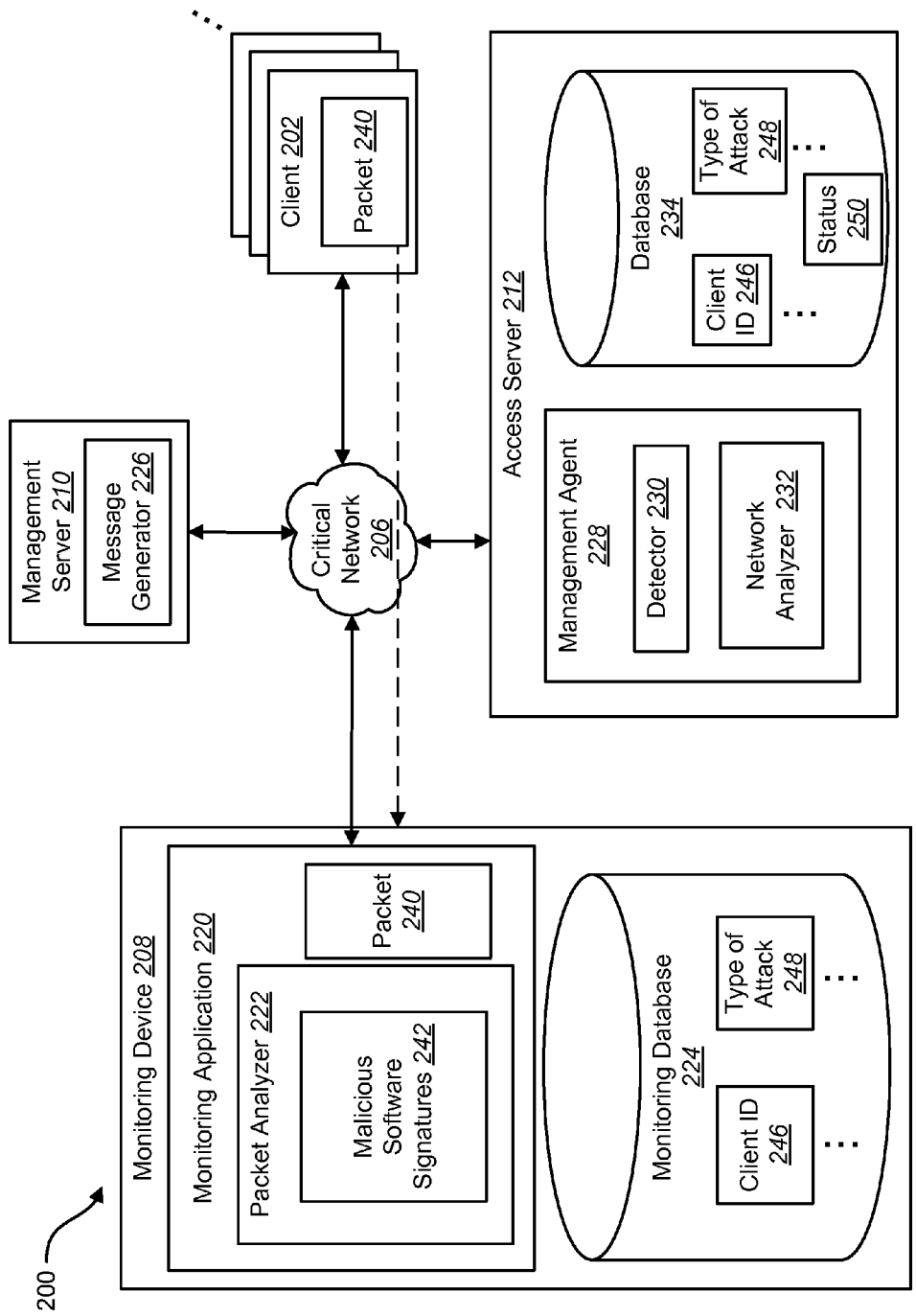
FIG. 2 is a block diagram illustrating one embodiment of a monitoring device.

FIG. 2 is a block diagram 200 illustrating a further embodiment of the monitoring device 208, the management server 210, and the access server 212. The monitoring device 208 may include a monitoring application 220. In one embodiment, the monitoring application 220 monitors the ports 104 of the monitoring device 208 and sends information to the management server 210 and the access server 212. In a further embodiment, the monitoring application 220 may monitor a subset of the ports 104 such as ports 135, 137, 138, 139, 161, 389, and 445. The subset of ports 104 includes the ports typically attacked by harmful elements such as the worm software. Alternatively, the application 220 may monitor each port 104 within the monitoring device 208. The monitoring application 220 may monitor the ports 104 for data and requests sent from other computing devices that may cause harm to the monitoring device 208.

The monitoring application 220 may also include a packet analyzer 222. Single ports within the monitoring device 208 may be enabled to perform multiple services. For example, a single port may be enabled to receive multiple types of packet data 240 from a computing device, such as the client 202. The packet analyzer 222 analyzes each packet 240 of data received by the ports 104 that are enabled to perform multiple services. If a harmful element is included in one of these various packets 240, the analyzer 222 may identify the type of packet 240 in order to analyze the type of attack attempted on the monitoring device 208. In one embodiment, the packet analyzer 222 includes malicious software signatures 242. A signature is a way to identify a particular piece of software, virus, worm, etc. A signature may include, but is not limited to, a binary pattern, a checksum, a file property (file size, file name, etc.), a file characteristic, etc. The analyzer 222 may determine if the packet 240 includes malicious software by comparing the packet 240 with the malicious software signatures 242. If the packet 240 includes a signature included in the malicious software signatures 242, the analyzer 222 determines the client 202 that sent the packet 240 is infected.

The monitoring device 208 may also include a monitoring database 224. The monitoring database 224 may be used to store information regarding the identity 246 of the client 202 and the type of attack 248 originating from the client 202. When the monitoring application 220 detects an attack from the client 202 at one of the ports 104, the client 202 is flagged by the monitoring application 220 as being infected and unfit to remain connected to the critical network 206. The application 220 may store the identity 246 of the client 202 and information about the attack 248 in the monitoring database 224. The information may include whether the attack was caused by worm software or another type of computer virus. The monitoring application 220 may then communicate the information stored in the monitoring database 224 to the management server 210 and the access server 212 over the critical network 206.

In one embodiment, the monitoring application 220 sends a command to the management server 210 to send a request to the infected client 202 to renew its connection with the access server 212 over the critical network 206. The management server 210 may include a message generator 226. When the management server 210 receives the command and information from the monitoring application 220 identifying the client 202 from which the attack originated, the message generator 226 may generate and send a renew connection message to the client 202. The message may include a request for the client 202 to renew its connection with the access server 212 over the critical network 206. An example of a management server 210 that may be used is the core server for the LANDesk® Management Suite.

The access server 212 may include a management agent 228 which may be connected to the monitoring application 220. The agent 228 may include a detector 230 which serves to flag the client 202 as an infected client 202 when information is received from the monitoring application 220. The management agent 228 also includes a network analyzer 232 which may provide a redirect command to the client 202 which serves to redirect the infected client 202 from the critical network 106 to the restricted network 118. The network analyzer 232 may also monitor the client 202 while the client 202 is connected to the restricted network 118. The analyzer 232 may provide a renew connection command to the client 202 after the harmful element has been removed from the client 202 during remediation. When the client 202 renews the connection on the restricted network 118, the network analyzer 232 may provide a redirect command to the client 202 which redirects the client 202 back to the critical network 106. The access server 212 may also include a database 234 which stores the information received from the monitoring application 220 including the identification 246 of the client 202 and the type of attack 248 on the monitoring device 208. The database 234 may also include the status 250 of each client 202. For example, the status 250 may indicate if a particular client is infected or not. An example of an access server 212 that may be used is the LANDesk® Trusted Access Server.

Figure 2A:
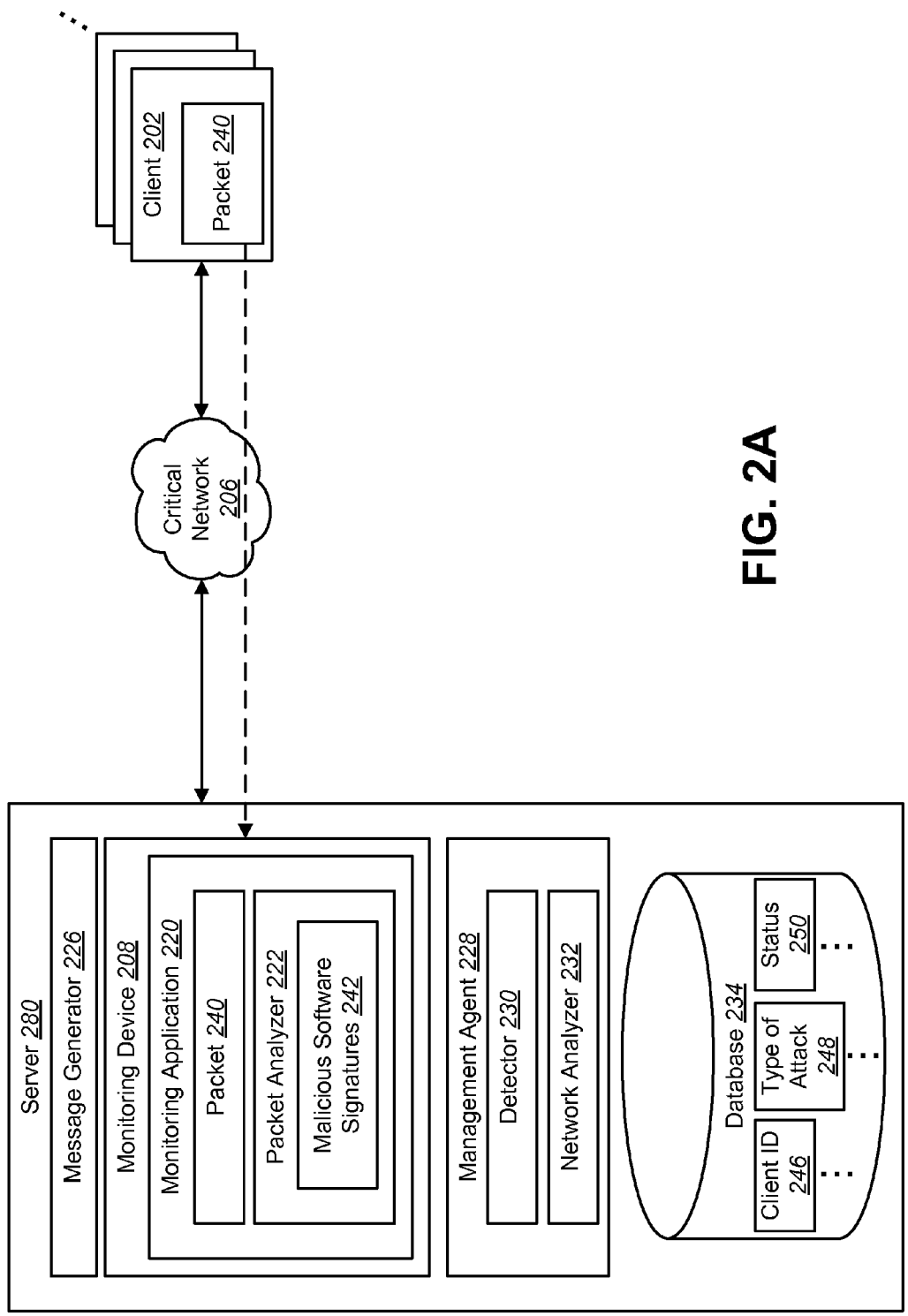
FIG. 2A is a block diagram illustrating a further embodiment of the monitoring device.

FIG. 2A is a block diagram illustrating another embodiment of the monitoring device 208. In the illustrated embodiment, a server 280 includes the message generator 226 which may generate a reconnect message to be sent to the client 202. The server 280 may also include the monitoring device 208. As previously explained, the monitoring device 208 may monitor ports for the packet 240 to determine whether or not the client 202 from which the packet 240 was sent is infected. In one embodiment, the monitoring application 220 includes the packet analyzer 222 which analyzes the packet 240. The packet analyzer 222 may include signatures 242 of malicious software in order to compare the information included in the packet 240.

In one embodiment, the server 280 also includes the management agent 228 which includes a detector 230 to flag the client 202 as an infected client. The management agent 228 further includes the network analyzer 232 which may redirect the infected client 202 from the critical network 206 to a restricted network. The server 280 may also include the database 234 which includes the identification 246 of the client 202, the type of attack 248 originating from the client 202, and the status 250 of the client 202 once the client 202 is redirected to the restricted network for remediation.

Figure 3:
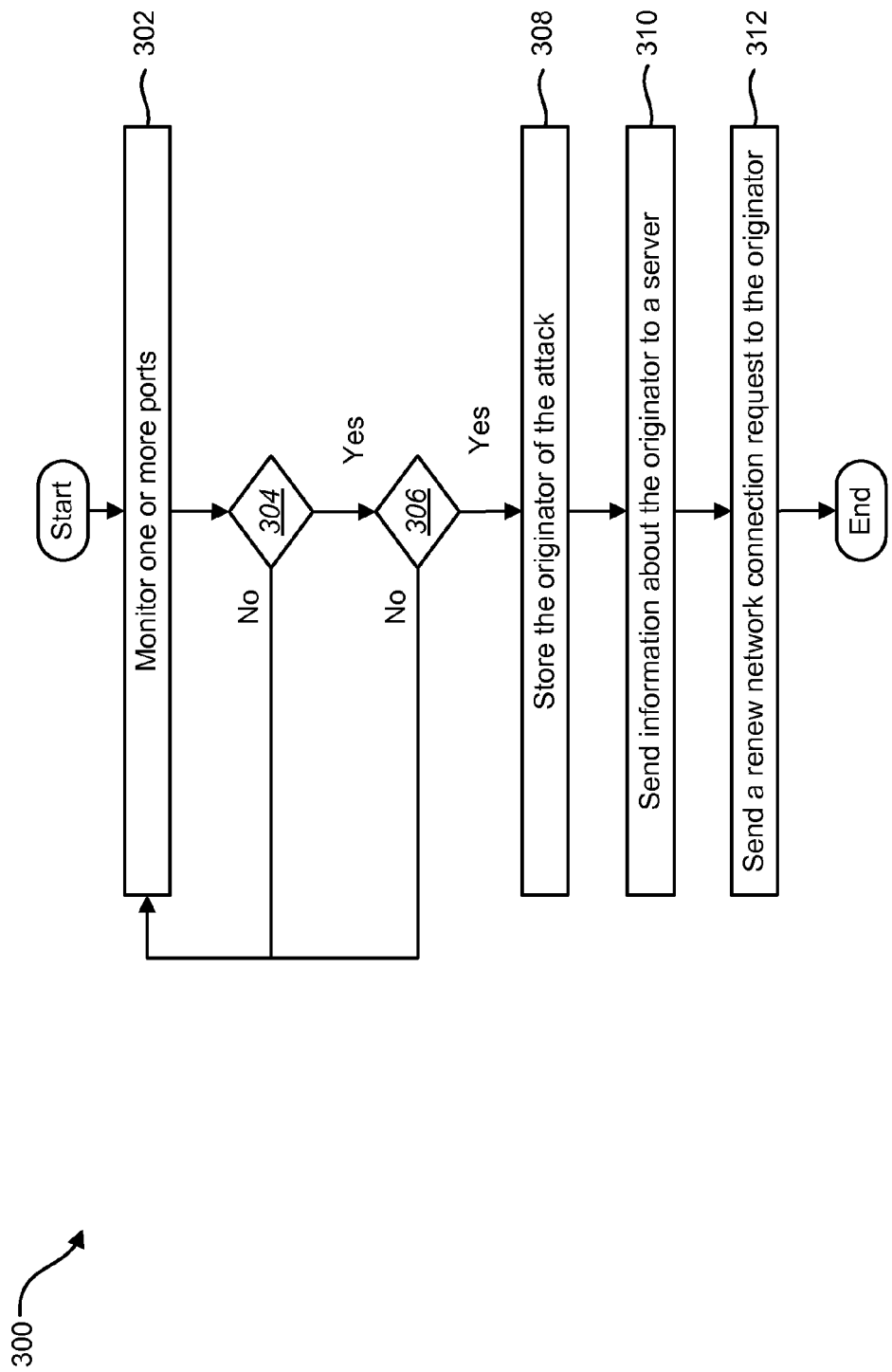
FIG. 3 is a flow diagram illustrating one embodiment of a monitoring method.

FIG. 3 is a flow diagram illustrating one embodiment of a monitoring method 300. The monitoring method 300 facilitates the monitoring device 108 to monitor the network ports 104 typically attacked by harmful elements, such as the worm software 120. The method 300 allows the monitoring device 108 to store information regarding the origination of the attack and send this information to a server.

The monitoring device 108 monitors 302 one or more network ports 104. In one embodiment, the monitoring application 220 within the device 108 monitors 302 the ports 104. The monitoring application 220 may monitor 302 all of the ports 104 or a subset of the ports 104. The application 220 may monitor 302 the ports 104 by detecting data or requests being received at the ports 104. If the monitoring application 220 does not 304 detect data or requests, the application 220 continues to monitor 302 the ports 104.

If the monitoring application 220 does 304 detect data or requests at one or more ports 104, the application 220 determines 306 if the received data or request is an attack on the monitoring device 108. The application 220 may determine 306 whether the received data or request is a potential attack (e.g., the received data/request includes a worm). The application 220 may use various methods and techniques to determine 306 whether the received data or request is a potential attack. For example, the application 220 may use commercially available software packages to determine 306 whether the received data or request is a worm.

If the application 220 determines 306 that the received data or request is an attack, the application 220 stores 308 information regarding the origination of the attack. For example, the application 220 may store 308 the identity of the client 102 which sent the data or request which was received at the ports 104. The application 220 may also store additional information regarding the attack. For example, the application 220 may store 308 the type of attack received at the ports 104. The type of attack may indicate which types of program files, data, etc. were the potential targets of the attack. The monitoring application 220 may store 308 the information about the attack in a database 224.

The monitoring application 220 sends 310 the information about the attack to the server. In one embodiment, the monitoring application 220 is connected to the management agent 228 and sends 310 the information to the agent 228. In one embodiment, a renew network connection request is sent 312 to the originator of the attack. The renew connection request may request that the client 102, from which the attack originated, renew its connection with the server over the critical network 106.

Figure 3A:
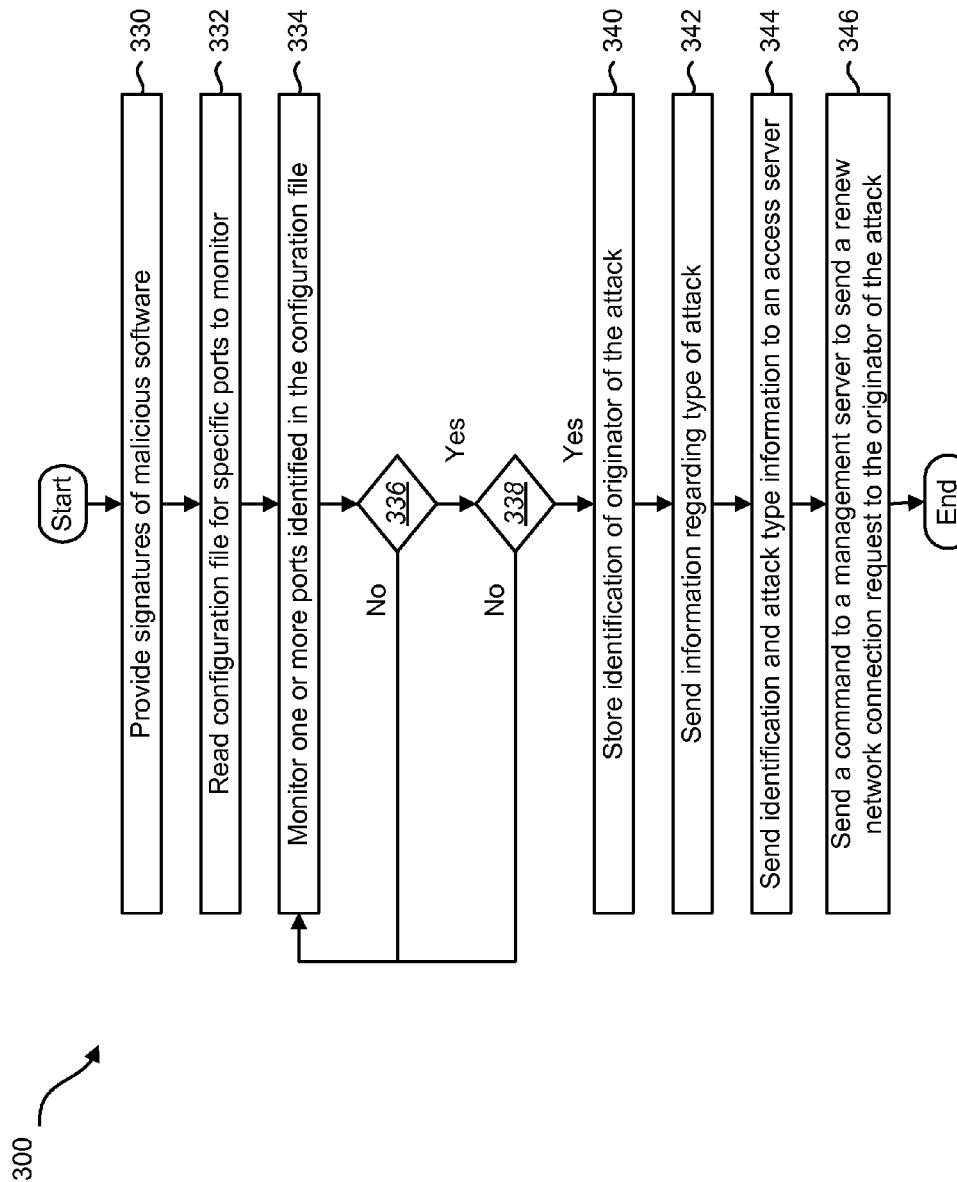
FIG. 3A is a flow diagram illustrating a further embodiment of the monitoring method.

FIG. 3A is an additional embodiment of the monitoring method 300. The monitoring method 300 facilitates the monitoring device 108 to monitor the network ports 104 typically attacked by harmful elements, such as the worm software. The method 300 allows the monitoring device 108 to store information regarding the origination of the attack and send this information to an access server 112.

In one embodiment, signatures 242 of malicious software are provided 330 to the monitoring device 108. The monitoring device 108 may read 332 a configuration file which may indicate the specific ports to monitor. In one embodiment, the monitoring device 108 monitors 334 one or more network ports 104 identified by the configuration file. In one embodiment, the monitoring application 220 within the device 108 monitors 334 the ports 104. The monitoring application 220 may monitor 334 all of the ports 104 or a subset of the ports

104. The application 220 may monitor 334 the ports 104 included in the configuration file by detecting data or requests being received at the ports 104. If the monitoring application 220 does not 336 detect data or requests, the application 220 continues to monitor 334 the ports 104.

If the monitoring application 220 does 336 detect data or requests at one or more ports 104, the application 220 determines 338 if the received data or request is an attack on the monitoring device 108. The application 220 may use various methods and techniques to determine 338 whether the received data or request is a potential attack.

If the application 220 determines 338 that the received data or request is an attack, the application 220 stores 340 information regarding the origination of the attack. For example, the application 220 may store 340 the identity of the client 102 which sent the data or request which was received at the ports 104. The application 220 may also store additional information regarding the attack. For example, the application 220 may store 342 the type of attack received at the ports 104. The type of attack may indicate which types of program files, data, etc. were the potential targets of the attack. The monitoring application 220 may store 342 the information about the attack in a database 224.

The monitoring application 220 sends 344 the information about the attack to the access server 112. In one embodiment, the monitoring application 220 is connected to the management agent 228 and sends 344 the information to the agent 228. The monitoring application 220 may also send 346 a command to a management server 110. The command may include a command to send a renew network connection request to the originator of the attack. The renew connection request may request that the client 102, from which the attack originated, renew its connection with the access server 112 over the critical network 106.

Figure 4:
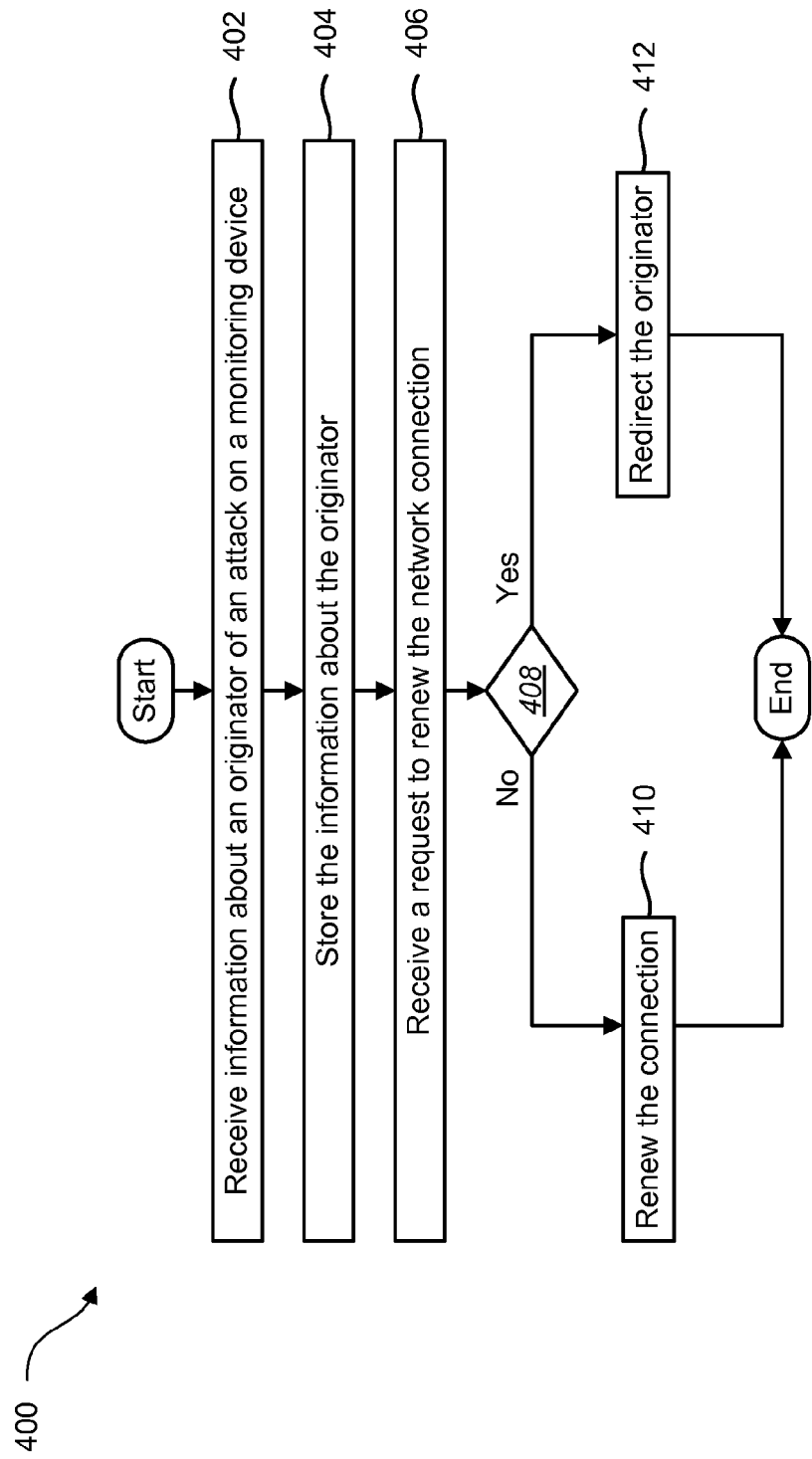
FIG. 4 is a flow diagram illustrating one embodiment of a redirect method.

FIG. 4 is a flow diagram illustrating a method 400 to redirect a computing device, such as the client 102, from the critical network 106 to the restricted network 118. The method 400 may be implemented by the management agent 228 within the access server 112. The client 102 may initially be allowed access to communicate on the critical network 106. The client 102 may then become infected by harmful elements, such as worm software or a computer virus. The client 102 may acquire the harmful elements from a web page, email file, etc. while connected to the critical network 106. The harmful elements may initiate an attack from the infected client 102 to other computing devices communicating on the critical network 106 within the secure environment 114. For example, an attack may be attempted on the monitoring device 108.

The management agent 228 may receive 402 information regarding the originator of the attack on the monitoring device 108. The information may include the identity of the infected client 102 as well as the type of attack attempted on the monitoring device 108. The type of attack may include information regarding the worm software, computer virus, etc. The management agent 228 may record 404 the information. In one embodiment, the information is stored 404 in the database 234.

The management agent 228 may receive 406 a request from a computing device to renew its connection with the access server 212. The management agent 228 determines 408 if the request was sent from the client 102 from which the attack originated. In one embodiment, the management agent 228 compares the identity of the computing device sending the renew connection request with the identity of the client 102 from which the attack originated. If the identity of the computing device sending the renew connection request matches the identity of the infected client 102, the management agent 228 redirects 412 the infected client 102 to the restricted network 118. In one embodiment, the network analyzer 232 redirects 412 the client 102 to the restricted network 118 by sending a redirect command to the client 102. If the management agent 228 determines 408 that the renew request was not sent from the infected client 102, the management agent 228 renews 410 the connection of the computing device with the access server 112 over the critical network 106.

Figure 5:
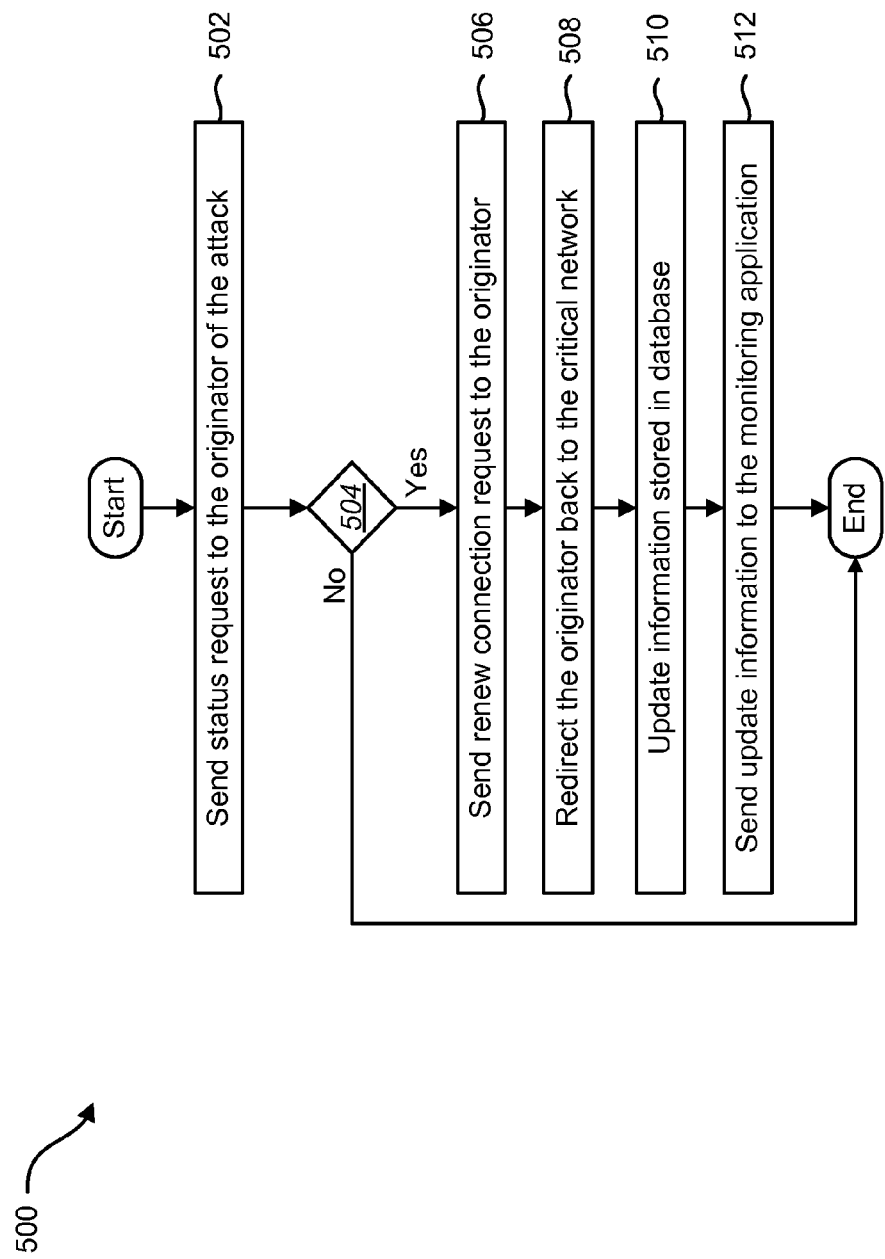
FIG. 5 is a flow diagram illustrating one embodiment of a method to monitor the status of a redirected client.

FIG. 5 is a flow diagram illustrating one embodiment of a method 500 to monitor the status of the client 102 while the client 102 is connected to the restricted network 118. In one embodiment, the client 102 may be connected to the restricted network 118 in order to eliminate the harmful element from the client 102 through remediation. The access server 112 may monitor the client 102 to determine when the remediation process has successfully eliminated the harmful elements from the infected client 102. In one embodiment, the network analyzer 232 monitors the progress of eliminating the harmful element from the infected client 102.

The network analyzer 232 may send 502 a status request to the client 102. The status request may include a query regarding the progress of the remediation process to eliminate the harmful elements from the client 102. In one embodiment, the client 102 may respond with the results of a diagnostics test. The diagnostics test may include scanning various components of the client 102 for the harmful elements. When the analyzer 232 receives the response, it determines 504 if the harmful elements have been successfully removed from the client 102 based on the results of the diagnostics test. If the harmful elements have not been removed from the client 102, the method 500 ends and the client 102 remains connected to the restricted network 118 for further remediation processes. The client 102 may not be allowed to reconnect to the critical network 106 because if the client 102 reconnects to the critical network 106, the harmful elements may initiate an attack on other computing devices connected on the critical network 106.

However, if the response including the results of the diagnostics test sent to the analyzer 232 indicates that the remediation process has successfully eliminated the harmful element, the network analyzer 232 sends 506 a renew connection request to the client 102. The renew connection request may include a request for the client 102 to renew its connection with the access server 112 over the restricted network 118.

The client 102 may send a renew connection request to the access server 112. The network analyzer 232 may receive the renew connection request and then redirect 508 the client 102 back to the critical network 106. The redirect of the client 102 back to the critical network 106 places the client 102 back in the secure environment 114 with other secure computing devices. When the client 102 is redirected 508 back to the critical network 106, the network analyzer 232 updates 510 the information stored in the database 234. In one embodiment, the updated information may indicate that the client 102 is no longer infected with the harmful element. The management agent 228 may send 512 the updated information regarding the client 102 to the monitoring application 220. The monitoring application 220 may also update the information in the monitoring database 224 to indicate that the client 102 is no longer infected with the harmful element.

Figure 6:
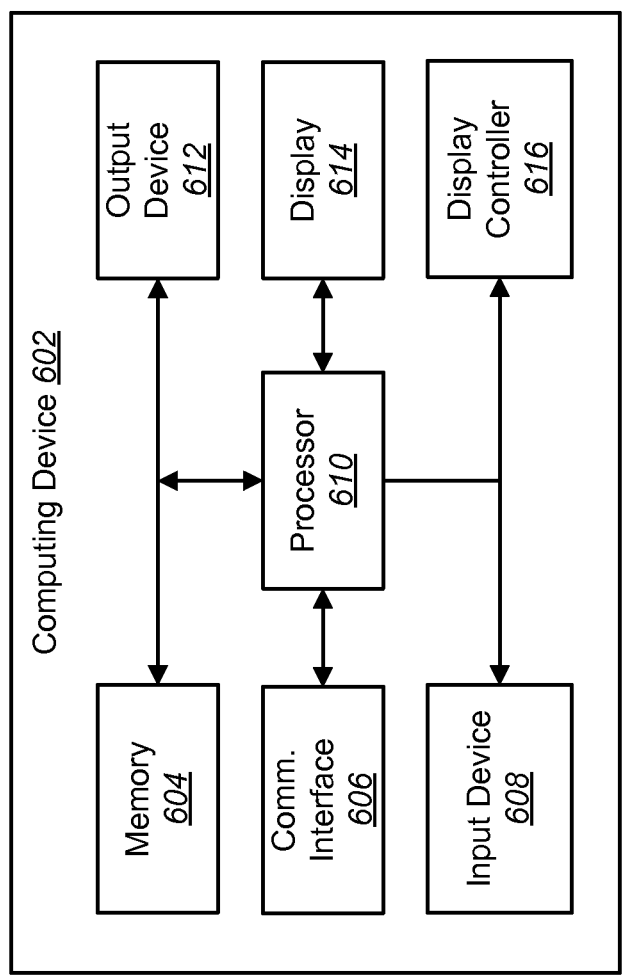
FIG. 6 is a block diagram illustrating the major hardware components typically utilized in a computing device.

FIG. 6 illustrates various components that may be utilized in a computing device 602 that may be used as a server and/or a client. The illustrated components may be located within the same physical structure or in separate housings or structures.

The computing device 602 includes a processor 610 and memory 604. The processor 610 controls the operation of the computing device 602 and may be embodied as a microprocessor, a microcontroller, a digital signal processor (DSP) or other device known in the art. The processor 610 typically performs logical and arithmetic operations based on program instructions stored within the memory 604.

The computing device 602 typically also includes one or more communication interfaces 606 for communicating with other electronic devices. The communication interfaces 606 may be based on wired communication technology, wireless communication technology, or both. Examples of different types of communication interfaces 606 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 602 typically also includes one or more input devices 608 and one or more output devices 612. Examples of different kinds of input devices 608 include a keyboard, mouse, microphone, remote control device, button, joystick, trackball, touchpad, lightpen, etc. Examples of different kinds of output devices 612 include a speaker, printer, etc. One specific type of output device which is typically included in a computer system is a display device 614. Display devices 614 used with embodiments disclosed herein may utilize any suitable image projection technology, such as a cathode ray tube (CRT), liquid crystal display (LCD), light-emitting diode (LED), gas plasma, electroluminescence, or the like. A display controller 616 may also be provided, for converting data stored in the memory 604 into text, graphics, and/or moving images (as appropriate) shown on the display device 614.

Of course, FIG. 6 illustrates only one possible configuration of a computing device 602. Various other architectures and components may be utilized.

FIG. 7 is an exemplary block diagram illustrating a computer network on which the present systems and methods may be implemented. In FIG. 7, an administrative system 701 connects to a router 703. The administrative system 701, or administrative node 701, may be any computer or computing device that has been configured to, or is being used for, receiving notifications from one or more monitors.

The router 703 may be connected to three switches: a first switch 705, a second switch 707 and a third switch 709. Each switch 705, 707, and 709 connects to three subnets. The first switch 705 connects to three subnets 710, 712, and 714. The second switch 707 connects to three subnets 716, 718, and 720. The third switch 709 connects to three subnets 722, 724, and 726. A network group may be embodied in a wide variety of configurations and may include a local area network, a subnet 710, 712, and 714, or a group of subnets 710, 712, and 714. The network nodes or elements 711, 713, 715, 717, 719, 721, 723, 725 and 727 represent computer systems or devices on the computer network. One or more of the nodes may use embodiments of the systems and methods described herein. The network may include both wired and wireless connections to nodes or elements 711, 713, 715, 717, 719, 721, 723, 725 and 727 within the network.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for redirecting a computing device from a first network to a second network comprising:
monitoring, by a monitoring device, a plurality of network ports;
detecting, by the monitoring device, a communication from a computing device at one of the network ports;

sending information from the monitoring device to a first server and a second server regarding the identity of the computing device;

sending a command from the monitoring device to the first server to send a request to the computing device to renew the connection with the second server, wherein the command is sent after the information regarding the identity of the computing device is sent from the monitoring device to the first server and the second server;

receiving a request from the computing device to renew its connection with the second server;

determining whether the request was sent from the computing device where an attack by a worm originated, wherein the determining occurs after the request to renew its connection was received; and redirecting the computing device to a second network from a first network;

wherein the monitoring device comprises the ports and is configured to appear to possess characteristics of a server and wherein the monitoring device configured to appear to possess characteristics of the server acts as bait for the worm to attack the monitoring device.

2. The method of claim 1, further comprising determining if the communication detected at one of the plurality of network ports includes a harmful element.

3. The method of claim 2, wherein the harmful element comprises the worm.

4. The method of claim 2, wherein the harmful element comprises a computer virus.

5. The method of claim 1, further comprising monitoring a subset of network ports.

6. The method of claim 5, wherein the subset of ports includes ports 135, 137, 138, 139, 161, 162, 389, and 445.

7. The method of claim 1, wherein a monitoring application on the monitoring device monitors the plurality of network ports.

8. The method of claim 1, wherein the second server redirects the computing device from the first network to the second network.

9. The method of claim 1, wherein a monitoring application on the monitoring device monitors a plurality of ports, wherein the monitoring application detects a communication comprising a harmful element at one of the ports, wherein the monitoring application sends the identity of the computing device to the first server and the second server, wherein the computing device renews the connection with the second server, and wherein the second server redirects the computing device to the second network.

10. A computer system that is configured to redirect a computing device from a first network to a second network, the computer system comprising:

a second server; and
a monitoring device having:
  a processor;
  memory in electronic communication with the processor;
  instructions stored in the memory, the instructions being executable to:
    monitor, by the monitoring device, a plurality of network ports;
    detect, by the monitoring device, a communication from a computing device at one of the network ports;
    send information from the monitoring device to a first server and the second server regarding the identity of the computing device;
    send a command from the monitoring device to the first server to send a request to the computing device to renew the connection with the second server, wherein the command is sent after the information regarding the identity of the computing device is sent from the monitoring device to the first server and the second server;
    determine whether the request was sent from the computing device where an attack by a worm originated, wherein the determining occurs after the request to renew its connection was received; and
    the ports, wherein the monitoring device is configured to appear to possess characteristics of a server and wherein the monitoring device configured to appear to possess characteristics of the server acts as bait for the worm to attack the monitoring device;
  wherein the second server receives a request from the computing device to renew its connection with the second server, wherein the second server redirects the computing device to a second network from a first network.

11. The system of claim 10, wherein the instructions detect a harmful element within the communication detected at one of the network ports.

12. The system of claim 11, wherein the harmful element comprises the worm.

13. The system of claim 11, wherein the harmful element comprises a computer virus.

14. The system of claim 10, wherein the instructions monitor a subset of the plurality of network ports.

15. The system of claim 14, wherein the subset of ports comprises ports 135, 137, 138, 139, 161, 162, 389, and 445.

16. A non-transitory computer-readable medium comprising executable instructions to redirect a computing device from a first network to a second network, the instructions being executable to:

monitor, by a monitoring device, a plurality of network ports;

detect, by the monitoring device, a communication from a computing device at one of the network ports;

send information from the monitoring device to a first server and a second server regarding the identity of the computing device;

send a command from the monitoring device to the first server to send a request to the computing device to renew the connection with the second server, wherein the command is sent after the information regarding the identity of the computing device is sent from the monitoring device to the first server and the second server;

determine whether the request was sent from the computing device where an attack by a worm originated, wherein the determining occurs after the request to renew its connection was received; and receive a request from the computing device to renew its connection with the second server, wherein the second server redirects the computing device to a second network from a first network;

wherein the monitoring device comprises the ports and is configured to appear to possess characteristics of a server and wherein the monitoring device configured to appear to possess characteristics of the server acts as bait for the worm to attack the monitoring device.

17. The non-transitory computer-readable medium of claim 16, wherein the instructions are further executable to detect a harmful element in the communication received at one of the network ports.

18. The non-transitory computer-readable medium of claim 16, wherein the instructions are further executable to monitor a subset of the plurality of network ports.

19. The non-transitory computer-readable medium of claim 18, wherein the subset of ports comprises ports 135, 137, 138, 139, 161, 162, 389, and 445.

\* \* \* \* \*